United States Patent [19]

Cunningham

[11] 4,011,485

[45] Mar. 8, 1977

[54] VALVE TYPE SURGE ARRESTER

[75] Inventor: Francis V. Cunningham, Western Springs, Ill.

[73] Assignee: Joslyn Mfg. and Supply Co., Chicago, Ill.

[22] Filed: May 30, 1975

[21] Appl. No.: 582,136

[52] U.S. Cl. .................................. 361/127; 313/220

[51] Int. Cl.[2] .......................................... H02H 9/06

[58] Field of Search .................... 317/61, 62, 67–70; 313/214, 220; 315/36

[56] References Cited

UNITED STATES PATENTS

| | | | |
|---|---|---|---|
| 1,935,810 | 11/1933 | McFarlin | 317/68 |
| 2,354,786 | 8/1944 | Wall | 313/220 X |
| 3,649,875 | 3/1972 | Nagai et al. | 317/70 X |

FOREIGN PATENTS OR APPLICATIONS

| | | | |
|---|---|---|---|
| 63,057 | 5/1949 | Netherlands | 317/68 |

*Primary Examiner*—Harry Moose
*Attorney, Agent, or Firm*—Mason, Kolehmainen, Rathburn & Wyss

[57] ABSTRACT

A valve type surge arrester includes a line terminal disposed partially within and spaced from a conductive outer housing that functions as a ground terminal. The surge arrester is formed with an extremely compact configuration and occupies only approximately 0.17 cubic inches of volume. Also disposed within the housing is a spark gap in series with a power follow current limiting valve block. An insulating spacer is disposed within the conductive outer housing. The spacer includes two integrally formed shoulders that determine the spark gap spacing and an integrally formed, tubularly shaped, extending portion that electrically insulates portions of the valve block from the conductive outer housing. An elastic sealing gasket resiliently compresses the line terminal, the spark gap structure, and the valve block components into series contact against an inner end of the housing. Simultaneously, the gasket also compensates for dimensional variations of all of the arrester components, centers the line terminal within the housing, provides line terminal to grounded housing internal and external dielectric insulation, seals the open end of the housing and seals the spark gap from portions of the housing, to thereby insure series operation of the spark gap and valve block in a minimized design configuration.

6 Claims, 4 Drawing Figures

VALVE TYPE SURGE ARRESTER

BACKGROUND OF THE INVENTION

A. Field of the Invention

The present invention generally relates to surge arresters and, more particularly, relates to valve type surge arresters suitable for mounting within the housings of small electrical equipment.

B. Description of the Prior Art

Valve type surge arresters are well known in the prior art and provide protection for associated electrical equipment from overvoltage surges. Examples of prior art surge arresters are disclosed in the following U.S. Pat. Nos: 3,141,108; 3,154,718; 3,435,290; 3,569,786; 3,723,819; and 3,849,704.

A particular need has developed for protecting submerged pump motors and other small electrical equipment from overvoltage surges. The devices disclosed in the U.S. Pat. Nos. 3,435,290 and 3,849,704 patents provide overvoltage surge protection for submerged pump motors. The device of the U.S. Pat. No. 3,435,290 is encased outside of and adjacent to a submerged pump. The device of the U.S. Pat. No. 3,849,704 is disposed inside a pump motor housing. The device of the U.S. Pat. No. 3,849,704 is a small, sealed, expulsion type arrester and has been found to function satisfactorily for shunting ten overvoltage surges including the associated power follow currents to ground. The principal disadvantage of the small, sealed, expulsion arrester is the high internal pressures that are built up within the arrester due to the high power follow currents. In addition, this particular small, sealed prior art arrester requires a minimum well depth of from 30 to 50 feet since it uses the resistance of the power line leads to limit the magnitude of power follow currents.

Thus, a need exists for an improved valve type arrester especially suited for use in providing overvoltage surge protection for submerged pump motors and other small electrical equipment, and preferably of a very small configuration such that the arrester may be mounted within the equipment.

SUMMARY OF THE INVENTION

An object of the present invention is to provide a new and improved valve type surge arrester.

Another object of the present invention is to provide a new and improved valve type surge arrester especially suited for use within small motors and other small electrical equipment.

Another object of the present invention is to provide a new and improved insulating spacer and elastic sealing gasket in a valve type surge arrester.

Another object of the present invention is to provide an extremely compact valve type surge arrester that is capable of meeting the Duty-Cycle test as specified in American National Standard C62.1 for secondary valve type surge arresters.

Briefly, the present invention provides a new and improved, extremely compact, valve type surge arrester that occupies less than 0.5 cubic inches of volume and meets the Duty-Cyle test specified in American National Standard C62.1. The dramatic size reduction of the instant invention has been accomplished both through a novel incorporation of assembly, structural, electrical and sealing functions into two simple components, and elastic gasket and a plastic insulator, and through the placement of the valve block so as to transfer heat generated within the valve block during arrester operation directly to a conductive arrester outer housing and into the relatively cool fluid or solid insulating media and the heat dissipating housing structure of the protected equipment.

The surge arrester includes a line terminal partially disposed within and spaced from a conductive outer housing that functions as a ground terminal. A first gap electrode is physically and electrically disposed in contact with the line terminal and is spaced from a second gap electrode by a new and improved insulating spacer to form a spark gap. The insulating spacer includes integrally formed shoulders that determine the spacing between the first and second gap electrode surfaces and an integrally formed, tubularly shaped, lowermost extending portion that electrically insulates the second gap electrode and portions of the valve block from the conductive outer housing. The second gap electrode physically and electrically contacts a power follow current limiting valve block that eliminates the need for a minimum length of power line lead required in the device disclosed in the U.S. Pat. No. 3,849,704. An elastic sealing gasket is disposed at one end of the conductive outer housing to simultaneously resiliently compress the line terminal, the spark gap structure, and the valve block components into series contact against an inner end of the housing. Simultaneously, the gasket also compensates for dimensional variations of all of the arrester components, centers the line terminal within the housing, provides line terminal to grounded housing internal and external dielectric insulation, seals the open end of the housing and seals the spark gap from portions of the housing, to thereby insure series operation of the spark gap and valve block in a minimized design configuration.

BRIEF DESCRIPTION OF THE DRAWING

Other objects, advantages and novel features of the present invention will become apparent from the following detailed description of a preferred embodiment of the present invention illustrated in the accompanying drawing wherein.

Figure 1:
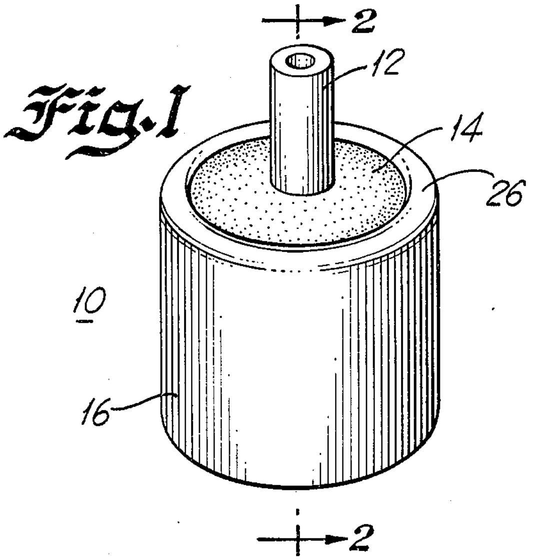
FIG. 1 is a perspective view of a preferred embodiment of a surge arrester constructed in accordance with the principles of the present invention.
Figure 2:
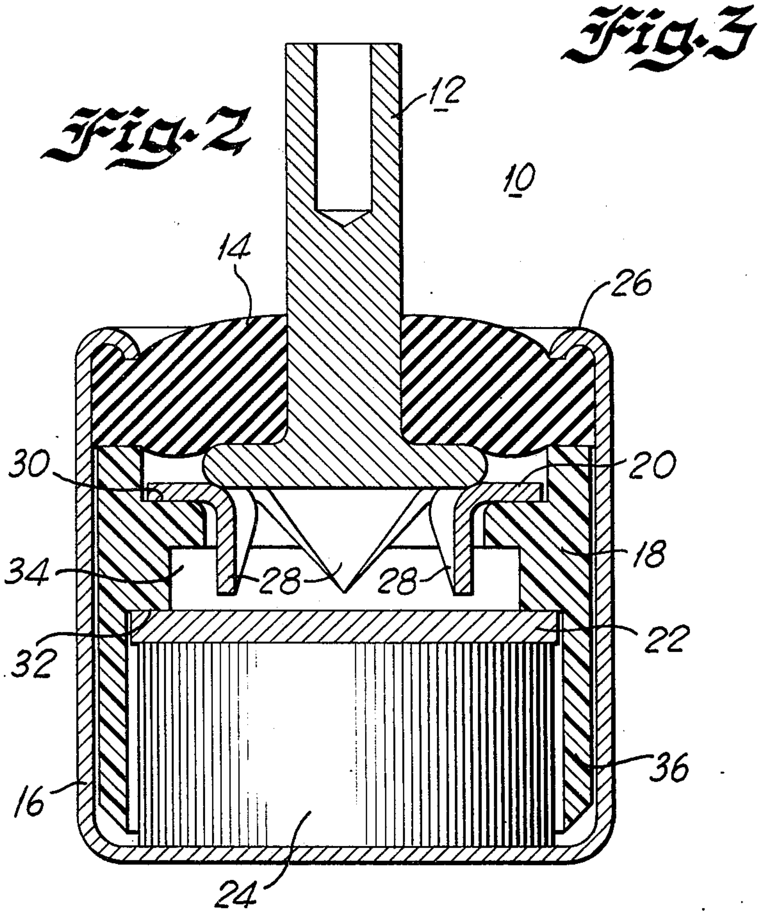
FIG. 2 is an enlarged, partially cross-sectional view of the device of FIG. 1 taken along line 2—2 of FIG. 1.
Figure 3:
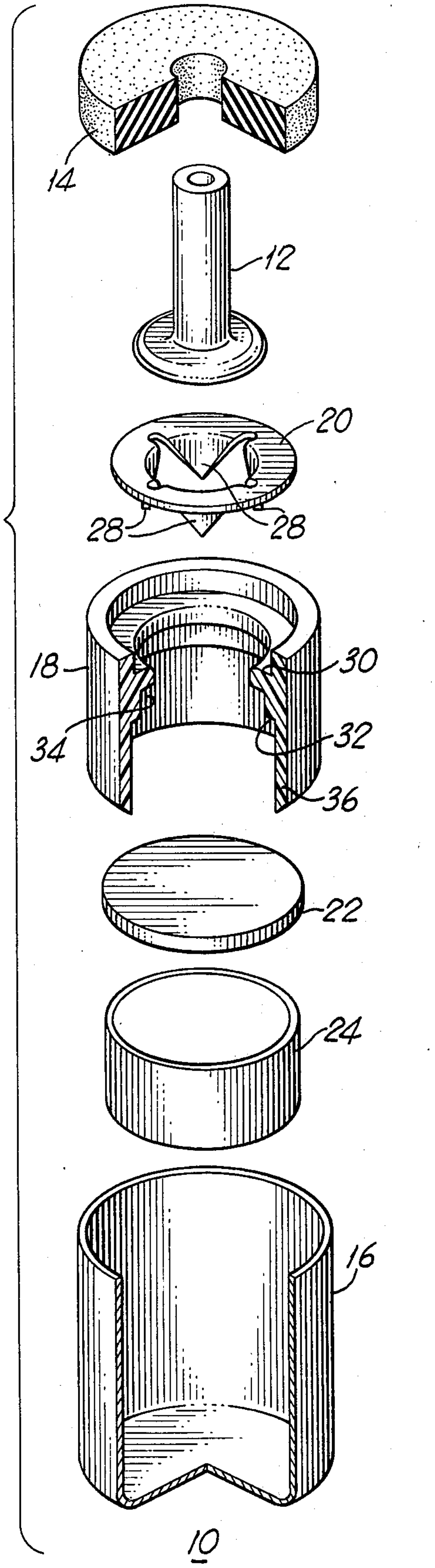
FIG. 3 is an exploded perspective view of the device of FIG. 1.
Figure 4:
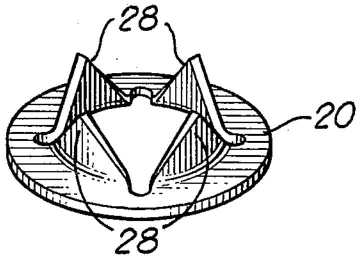
FIG. 4 is a perspective view of a portion of the device of FIG. 1.

Referring to the drawing (FIGS. 1 through 4), a new and improved valve type surge arrester 10 constructed in accordance with the principles of the present invention includes a line terminal 12 for connection to an internal power line lead of a submerged pump motor or other small electrical equipment; an elastic sealing gasket 14, formed in a preferred embodiment from neoprene; a conductive arrester outer housing 16 preferably electrically connected to ground potential and formed in a preferred embodiment from aluminum; an insulating spacer 18, formed in a preferred embodiment from polyethylene; a first gap electrode 20, formed in a prefered embodiment from half hard brass; a second gap electrode 22, formed in a preferred embodiment from hard temper brass; and a valve block 24, formed in a preferred embodiment from silicon carbide. Alternately, the terminal 12 and the electrode 20 may be formed as one part.

In accordance with an important feature of the present invention, the arrester 10 has a very compact configuration and occupies only approximately 0.17 cubic inches of volume as compared to the 1.95 cubic inches of volume per arrester pole occupied by a known prior art valve type surge arrester. In a specific embodiment, the housing 16 has a height of approximately 0.645 inches prior to the rolling over of the end 26 of the housing 16 at the completion of the assembly of the arrester 10, an inner diameter of approximately 0.562 inches and an outer diameter of approximately 0.594 inches. The remaining components of the surge arrester 10 are correspondingly dimensioned as illustrated in the accompanying drawing. Thus, the arrester 10 is ideally suited for placement within a small motor or other equipment since it occupies a very small volume.

In accordance with a further important feature of the present invention, the gasket 14 functions simultaneously to resiliently compress the line terminal 12, gap electrode 20, gap spacer 18, combined gap electrode and valve block contact 22, and valve block 24 against the inner end of the housing 16, thereby compensating for all dimensional variations affecting the arrester assembly and assuring proper electrical contact between the arrester components. The gasket 14 further functions to provide the external and internal line terminal 12 to ground terminal (housing 16) insulation, to centrally position the line terminal 12 within the housing 16, to hermetically seal the open end of the housing 16 and to seal the spark gap and space surrounding the spark gap from the more closely spaced portions of the housing 16, thereby insuring that electrical current flow during an arrester operation occurs across the spark gap and through the valve block 24. The electrode 20 includes a plurality of protuberant portions 28, the ends of which form the spark gap between the electrode 20 and the electrode 22. The spark gap spacing is, in a specific embodiment, 0.020 inches to allow spark over of the spark gap when the voltage exceeds 1300 volts and before the voltage exceeds 2300 volts.

In accordance with a further important feature of the present invention, the spacer 18 is formed with a generally tubular configuration and includes an integrally formed uppermost shoulder 30, an integrally formed lowermost shoulder 32 and an integrally formed intermediate cutaway portion 34. The shoulder 30 positions the electrode 20 and the shoulder 32 positions the electrode 22 to thereby determine the spacing between the electrodes 20 and 22. The cutaway portion 34 provides a relatively long creep path to insure that spark over and current flow occurs across the spark gap formed by the ends of the portions 28 of the electrode 20 and the electrode 22.

The spacer 18 further includes a integrally formed, generally tubularly shaped, lowermost extending portion 36 that electrically insulates the electrode 22 and an elongated portion of the outer periphery of the valve block 24 from portions of the housing 16 to insure that current flows through the valve block 24 rather than shorting to the wall of the housing 16.

In this manner, a new and improved, compact, valve type surge arrester is provided and is especially adapted for providing overvoltage surge protection for small motors and their associated electrical equipment. Obviously, many modifications and variations of the present invention are possible in light of the above teachings. Thus it is to be understood that, within the scope of the appended claims, the invention may be practiced otherwise than as specifically described.

What is claimed and desired to be secured by Letters Patent of the United States is:

1. A surged arrester comprising, a conductive arrester outer housing, a power follow current limiting valve block disposed entirely within said housing and conductively connected to said housing through a low electrical resistance path, first spark gap electrode means disposed within said housing, means for electrically connecting said first electrode means to an electrical power source, second spark gap electrode means electrically disposed within said housing, spaced from said first electrode means to form a spark gap and connected through a low electrical resistance path to said valve block and an insulating spacer disposed entirely within said housing including first integrally formed means for positioning said first electrode means within and spaced from said housing to thereby electrically insulate said first electrode means from an adjacent portion of the inner surface of said housing, second integrally formed means for positioning said second electrode means within and spaced from said housing to thereby electrically insulate said second electrode means from an adjacent portion of the inner surface of said housing, third integrally formed means for forming a relatively long electrical creep path between said first and second electrode means and fourth integrally formed means for electrically insulating a portion of the outer periphery of said valve block from adjacent portions of the inner surface of said housing.

2. A surge arrester comprising a conductive arrester outer housing, a power follow current limiting valve block disposed entirely within said housing and conductively connected to said housing through a low electrical resistance path, first spark gap electrode means disposed within said housing, means for electrically connecting said first electrode means to an electrical power source, second spark gap electrode means electrically disposed within said housing, spaced from said first electrode means to form a spark gap and connected through a low electrical resistance path to said valve block, an insulating spacer disposed entirely within said housing including first integrally formed means for positioning said first electrode means within and spaced from said housing to thereby electrically insulate said first electrode means from an adjacent portion of the inner surface of said housing, second integrally formed means for positioning said second electrode means within and spaced from said housing to thereby electrically insulate said second electrode means from an adjacent portion of the inner surface of said housing, third integrally formed means for forming a relatively long electrical creep path between said first and second electrode means and fourth integrally formed means for electrically insulating a portion of the outer periphery of said valve block from adjacent portions of the inner surface of said housing and an elastic gasket disposed at an end of said housing, said gasket comprising means for electrically insulating said connecting means from said housing, means for positioning said connecting means within said housing, means for hermetically sealing said end of said housing and means for sealing said spark gap and said first electrode means from portions of the inner surface of said housing to thereby assure series current flow across said spark gap and through said valve block during arrester operation.

3. A surge arrester as defined in claim 1 wherein sad first and second positioning means comprise shoulders formed in said insulating spacer.

4. A surge arrester as defined in claim 1 wherein said insulating spacer is generally tubularly shaped and wherein said fourth insulating means comprises a generally tubularly shaped extending portion physically disposed between said second electrode means and said portion of the outer periphery of said valve block and said portions of the inner surface of said housing.

5. A surge arrester as defined in claim 1 wherein the volume occupied by said surge arrester is less than 0.50 cubic inches.

6. A surge arrester as defined in claim 5 wherein said volume approximately equals 0.17 cubic inches.

* * * * *

FO-1050
(5/69)

UNITED STATES PATENT OFFICE

CERTIFICATE OF CORRECTION

Patent No. 4,011,485 Dated March 8, 1977

Inventor(s) Francis V. Cunningham

It is certified that error appears in the above-identified patent and that said Letters Patent are hereby corrected as shown below:

Claim 3, column 6, line 1, change "sad" to --said--.

Signed and Sealed this

Third Day of May 1977

[SEAL]

*Attest:*

RUTH C. MASON
*Attesting Officer*

C. MARSHALL DANN
*Commissioner of Patents and Trademarks*